Nov. 25, 1952 H. E. HUMPHRIES 2,619,550
TELEPHONE EXTENSION CONTROL SYSTEM
Filed Nov. 20, 1948
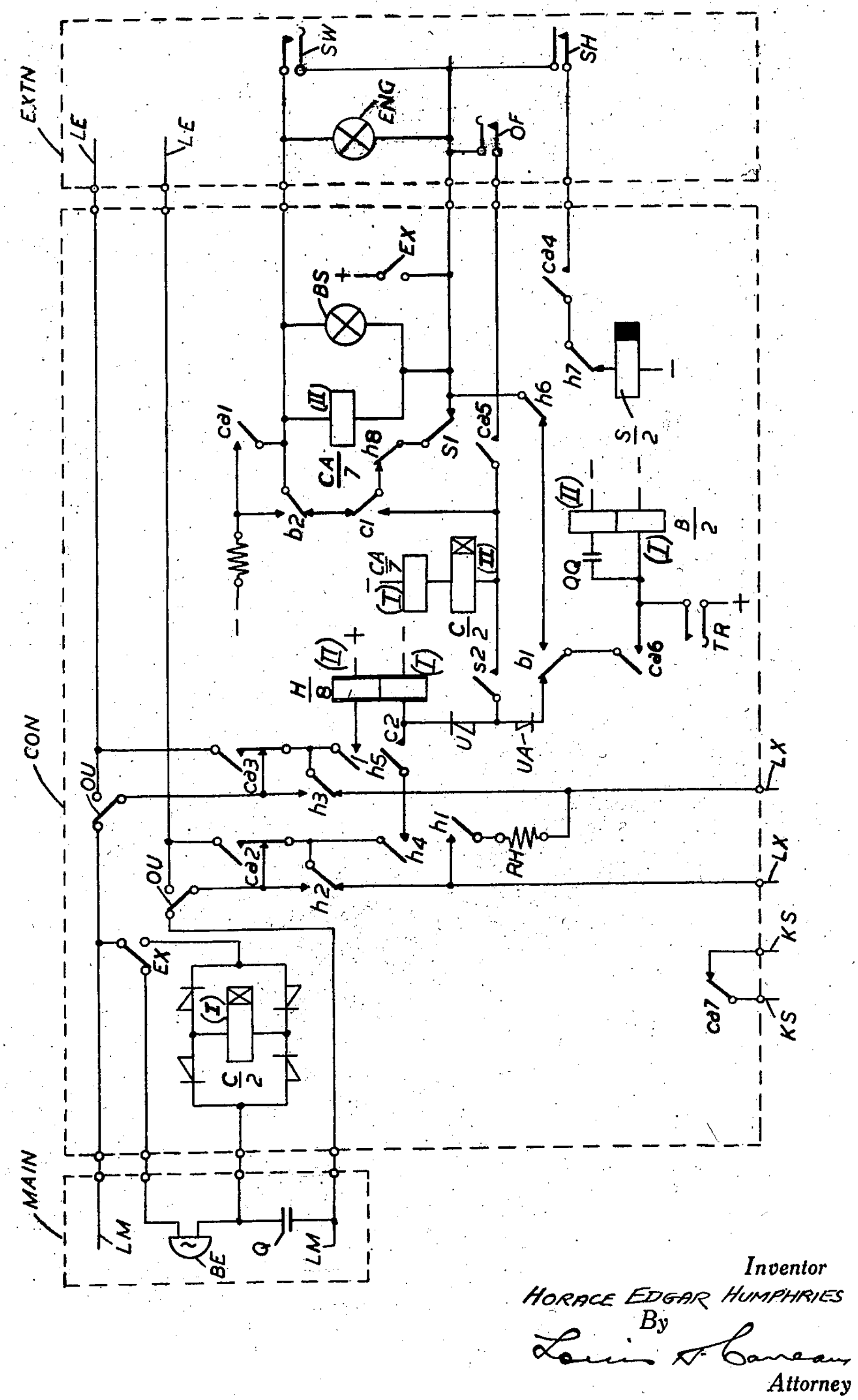
Inventor
HORACE EDGAR HUMPHRIES
By
Louis A. Carreau
Attorney Patented Nov. 25, 1952 2,619,550

UNITED STATES PATENT OFFICE 2,619,550

TELEPHONE EXTENSION CONTROL SYSTEM

Horace Edgar Humphries, London, England, assignor to Siemens Brothers & Co. Limited, London, England, a British company Application November 20, 1948, Serial No. 61,290
In Great Britain November 26, 1947

3 Claims. (Cl. 179—81)

The present invention relates to telephone systems. More specifically, it is concerned with substation extension arrangements of the kind in which substation apparatus connected to an exchange line comprises a main telephone, an extension telephone, and extension control equipment arranged so as to enable the user of the extension telephone (e. g. a secretary) to filter when required calls for the user of the main telephone (e. g. an executive official). For convenience in description, such arrangements will hereinafter be termed substation extension arrangements of the kind referred to, and the terms "main" and "extension" will be used to mean respectively the users of main and extension telephones.

According to the invention, the extension control equipment in substation extension arrangements of the kind referred to is arranged to provide full facilities for the filtration of incoming calls by "extension" under conditions such that "main" has merely to lift the receiver or handset to obtain access to the exchange line to set up a call at times when the line is free, or to take a call offered by "extension," and such that conversations between "extension" and "main" are not transmitted over the exchange line and that "extension" cannot listen to conversations between "main" and other parties.

In the preferred manner of carrying out the invention, it is arranged that the filtration of incoming calls by "extension" takes place under circuit conditions in which normally the exchange line is connected to the main telephone and the extension telephone is dead, and in which the receipt of ringing current brings about the operation and locking up of a call answering line switching relay whereby the exchange line is automatically switched over from the main telephone to the extension telephone. It is further arranged that the circuit conditions referred to are such that the operation of an "offer" key by "extension" brings about the operation of a local conversation line switching relay whereby a local conversational circuit isolated from the exchange line is set up between the main and extension telephones, and that the operation of a "switch" key by "extension" to switch an offered call through to "main" brings about the release of the call answering line switching relay.

By way of example, a specific embodiment of the invention will now be described with reference to the accompanying drawing, which is a circuit diagram illustrating the substation extension arrangements which form this embodiment.

In the case of this embodiment, the extension control equipment comprises a control unit within reach of "main," and, for the use and guidance of "extension," and preferably as parts of the extension telephone set, "offer" and "switch" keys and an "engaged" lamp. In the circuit diagram, the apparatus of the control unit is shown contained within the broken line rectangle CON, whilst certain apparatus associated with the main and extension telephones is shown contained within the broken line rectangles MAIN and EXTN respectively. In the rectangle MAIN, wires LM represent the speaking wires of the main telephone set, and BE and Q represent respectively the usual bell and condenser of this set. In the rectangle EXTN, wires LE represent the speaking wires of the extension telephone set, ENG represents the "engaged" lamp already referred to, and SH represents a switch-hook contact which is closed when "extension" lifts the receiver or handset of the extension telephone set. The "offer" and "switch" keys are shown at OF and SW respectively. The control unit comprises a call answering line switching relay CA, a local conversation line switching relay H, a ringing receiving relay C, an extension answering supervisory relay S, and a signal-generating relay B. The unit also comprises an "extend" key EX having a changeover contact and a make contact (shown separated in the drawing), a "transfer" key TR, an "out" key OU having two change-over contacts (shown separated in the drawing), and an "engaged" lamp BS. The "extend" and "out" keys are locking, but all the other keys of the embodiment are non-locking. Wires LX are connected to the exchange line, either directly or through a subscriber's keysender for use by "main." Where "main" is provided with a subscriber's keysender, wires KS are connected so that the opening of contact *ca1* disables the keysender. In order to obviate false operation of the ringing receiving relay C by short duration transients, the relay is of the slow operating type, satisfactory response of the relay to ringing current being obtained by connecting its operating winding (I) in a rectifier bridge circuit.

When all the keys are at normal with their contacts in the condition in which they are shown in the drawing, the exchange line is normally connected through to the main telephone over back contacts *h2*, *ca2*, *h3*, *ca3*, and the extension telephone is dead.

The "extend" key EX is operated when "main" wishes incoming calls to be filtered by "extension." In the absence of an incoming call on the line, the only effect of this is that the operating winding (I) of the ringing receiving relay C and the rectifier bridge circuit associated therewith are connected in place of the bell BE of the main telephone, so that "main" has still merely to lift the receiver or handset to obtain access to the exchange line to set up an outgoing call, and the extension telephone remains dead.

In the case of an incoming call with the "extend" key EX operated, the ringing receiving relay C operates on its winding (I) in response to the ringing current. Contact *c1* closes a circuit, over the make contact of the "extend" key EX and contacts *s1* and *h8*, for the holding winding (II) of relay C and the operating winding (I) of the call answering line switching relay CA. Relay CA operates, and at contact *ca1* closes a circuit over a series resistance and the make contact of key EX for its holding winding (II) and for the "engaged" lamps BS and ENG. Contacts *ca2* and *ca3* switch the exchange line over to the extension telephone so that the ringing current is diverted thereto. Contact *ca7* disables the subscriber's keysender if one is fitted. When "extension" answers, the switch-hook contact SH completes a circuit over the make contact of key EX and contacts *ca4* and *h7* for the extension answering supervisory relay S, which operates and at contact *s1* opens the holding circuit of the ringing receiving relay C. Relay C releases. The main telephone is dead at this stage. If "extension" clears in these or similar circumstances, the consequent release of the extension answering supervisory relay S brings about the release of the call answering line switching relay CA by short-circuiting winding (II) thereof, and the circuit for this winding (II) and the "engaged" lamps BS and ENG is opened at contact *ca1*. To offer the call to "main," "extension" uses the "offer" key OF. During each period of operation of this key in the circumstances being considered, the holding winding (II) of the ringing receiving relay C and winding (I) of the local conversation line switching relay H are energised in a circuit over the make contact of key EX and contact *ca5*, the circuit for winding (II) of relay C also including winding (I) of relay CA, and the circuit for winding (I) of relay H also including contact *s2* and a rectifier U. Relays C and H are then operated during each such period. On such operation, an early make contact of relay H, namely contact *h1*, connects a holding loop (in the form of a resistance RH) across the exchange line before contacts *h2* and *h3* disconnect this line from the speaking wires leading to the main and extension telephones. The effect of the changing over of contacts *h2* and *h3* and the closing of contacts *h4*, *h5* and *c2* is that a local conversational circuit is set up between the main and extension telephones, this circuit being isolated from the exchange line and having a battery feed over windings (I) and (II) of relay H. The opening of contact *h7* initiates the slow release of the extension answering supervisory relay S. During the release period of relay S, the signal-generating relay B buzzes by self-interruption of its circuit to give an audible signal to "main," the control unit being sufficiently close to "main" for "main" to hear the sound mechanically produced by the buzzing action. The self-interrupted circuit for relay B passes over the make contact of key EX, the contact of the "offer" key OF, contacts *ca5* and *s2*, a rectifier UA, and contacts *b1* and *ca6*. By reason of the condenser QQ and the arrangement of its windings (I) and (II), relay B is made to have operating and releasing lags sufficient to produce a satisfactory buzzing action. The windings (I) and (II) of relay B are in opposition when energised in parallel, and aid each other when energised in series. By operating and releasing the "offer" key OF a number of times, "extension" can give a code signal to "main." To switch the call through to "main" after "main" has lifted the receiver or handset, "extension" first releases the "offer" key OF and then holds the "switch" key SW operated until the extension telephone goes dead. The release of key OF opens the circuit of winding (II) of relay C, so that this relay releases and at contact *c2* opens the circuit of windings (I) and (II) of relay H. Thus relay H releases in turn, and at contact *h7* again closes the circuit of relay S, which again operates. Relay CA holds over the momentary short-circuit across its holding coil (II) which occurs when contact *h8* falls back and and which is terminated by the opening of contact *s1*. The "switch" key SW acts by short-circuiting the said holding coil (II) so as to bring about the release of the coil answering line switching relay CA, whereupon contacts *ca2* and *ca3* switch the exchange line over to the main telephone, and contact *ca4* releases relay S.

With the "extend" key EX operated, "main" can give "extension" the exchange line (for example, to switch a call back to "extension" or to enable "extension" to assist "main" by getting a required number) by first getting "extension" to lift the receiver or handset of the extension telephone (for example by a request passed over a separate intercommunication telephone system) and then momentarily operating the "transfer" key TR. The operation of the "transfer" key TR closes an obvious operating circuit for relay B, the circuit in this case not being a self-interrupting one since signal generation is not required. Contact *b2* closes a circuit for operating the call answering line switching relay CA on its winding (II). Contacts *ca2* and *ca3* switch the exchange line over to the extension telephone, contact *ca1* closes a holding circuit for relay CA, and contact *ca6* closes a holding circuit over contacts *b1* and *h6* for relay B. "Extension" can cause the circuit to revert to normal "extend" conditions by operating the "switch" key, thereby short-circuiting winding (II) of relay CA with the result that relays CA and B release in turn. Alternatively, "extension" can offer a call to "main" by the usual "offer" procedure as already explained, in which case the locking circuit of relay B is opened at contact *h6* on the operation of the local conversation line switching relay H.

The "out" key OU provides for switching the exchange line through to "extension," for example at times when "main" is absent.

What is claimed is:

1. In a telephone system, an exchange line; a subscriber's station to which said exchange line extends; a main telephone set at said station; an extension telephone set associated with said main telephone set; speaking wire circuits at said station serving to connect said main telephone set to said exchange line; a call answering line switching relay at said station for opening said speaking wire circuits and connecting said extension telephone set to said exchange line in place of said main telephone set; means at said station across said exchange line, responsive to the receipt of ringing current over said exchange line, for operating said call answering line switching relay; a holding circuit for said call answering line switching relay; and a key at said extension telephone set for controlling the energizing current through said holding circuit operable to disable said holding circuit to release said call answering line switching relay and thereby transfer to said main telephone set a call initially answered at said extension telephone set.

2. In a telephone system, an exchange line; a subscriber's station to which said exchange line extends; a main telephone set at said station; an extension telephone set associated with said main telephone set; speaking wire circuits at said station serving to connect said main telephone set to said exchange line; a call answering line switching relay at said station for opening said speaking wire circuits and connecting said extension telephone set to said exchange line in place of said main telephone set; means at said station across said exchange line, responsive to the receipt of ringing current over said exchange line, for operating said call answering line switching relay; a holding circuit for said call answering line switching relay; a local conversational circuit between said main and extension telephone sets; a normally-open holding loop at said station across said exchange line; a local conversational line switching relay at said station having contacts for closing said local conversational circuit and for simultaneously isolating said local conversational circuit from said exchange line, and for closing said holding loop across said exchange line; a key at said extension telephone set for closing said local conversational line switching relay; and an operating circuit for said local conversational line switching relay including normally open contacts of said call answering line switching relay and of said key to render said key ineffective during periods in which said call answering line switching relay is unoperated.

3. In a telephone system, an exchange line; a subscriber's station to which said exchange line extends; a main telephone set at said station; an extension telephone set associated with said main telephone set; speaking wire circuits at said station serving to connect said main telephone set to said exchange line; a call answering line switching relay at said station for opening said speaking wire circuits and connecting said extension telephone set to said exchange line in place of said main telephone set; an operating circuit for said call answering line switching relay; means at said station across said exchange line, responsive to the receipt of ringing current over said exchange line, for closing said operating circuit; a holding circuit for said call answering line switching relay; a further operating circuit for said call answering line switching relay; a key at said station; means controlled by said key serving to close said further operating circuit; and a key at said extension telephone set for controlling the energizing current through said holding circuit operable to disable said holding circuit to release said call answering line switching relay.

HORACE EDGAR HUMPHRIES.

REFERENCES CITED

The following references are of record in the file of this patent:

UNITED STATES PATENTS

| Number | Name | Date |
|---|---|---|
| 1,783,310 | Saunders | Dec. 2, 1930 |
| 1,888,337 | Voss | Nov. 22, 1932 |
| 1,965,123 | Kardorff | July 3, 1934 |
| 2,091,132 | Crocker | Aug. 24, 1937 |
| 2,095,712 | Peterson | Oct. 12, 1937 |